United States Patent
Prakash et al.

(10) Patent No.: US 9,054,831 B2
(45) Date of Patent: Jun. 9, 2015

(54) OPTICAL COMMUNICATION NETWORK PATH RESTORATION

(75) Inventors: Anurag Prakash, Noida (IN); Mohit Chhillar, Delhi (IN); Marian Trnkus, Chevy Chase, MD (US)

(73) Assignee: Ciena Corporation, Hanover, MD (US)

( * ) Notice: Subject to any disclaimer, the term of this patent is extended or adjusted under 35 U.S.C. 154(b) by 153 days.

(21) Appl. No.: 13/401,969

(22) Filed: Feb. 22, 2012

(65) Prior Publication Data

US 2013/0177305 A1    Jul. 11, 2013

(30) Foreign Application Priority Data

Jan. 5, 2012  (IN) .............. 42/DEL/2012

(51) Int. Cl.
   *H04J 14/00*  (2006.01)
   *H04J 1/16*   (2006.01)
   *H04J 14/02*  (2006.01)

(52) U.S. Cl.
   CPC ......... *H04J 14/0269* (2013.01); *H04J 14/0268* (2013.01)

(58) Field of Classification Search
   CPC ................... H04J 14/0268; H04J 14/0269
   USPC .......................................... 398/5, 1
   See application file for complete search history.

(56) References Cited

U.S. PATENT DOCUMENTS

| | | | |
|---|---|---|---|
| 6,763,190 B2 * | 7/2004 | Agrawal et al. .................... 398/5 |
| 7,296,087 B1 * | 11/2007 | Ashwood Smith ........... 709/238 |
| 7,606,494 B1 * | 10/2009 | Weston-Dawkes et al. .... 398/83 |
| 8,682,160 B2 * | 3/2014 | Prakash et al. .................. 398/48 |
| 8,767,550 B2 * | 7/2014 | Xiang ......................... 370/235 |
| 2005/0185956 A1 * | 8/2005 | Emongkonchai ................ 398/17 |
| 2005/0237950 A1 * | 10/2005 | Yuan et al. .................... 370/255 |
| 2006/0114818 A1 * | 6/2006 | Canali et al. .................. 370/216 |
| 2009/0296719 A1 * | 12/2009 | Maier et al. ................... 370/400 |
| 2010/0284691 A1 * | 11/2010 | Zottmann ....................... 398/49 |
| 2011/0268439 A1 * | 11/2011 | Gerstel et al. ................... 398/34 |
| 2012/0051745 A1 * | 3/2012 | Srinivasan et al. ............. 398/58 |
| 2012/0057868 A1 * | 3/2012 | Wang et al. ..................... 398/49 |
| 2012/0077960 A1 * | 3/2012 | Bradbury et al. ............. 530/350 |
| 2012/0163797 A1 * | 6/2012 | Wang ............................... 398/2 |

\* cited by examiner

*Primary Examiner* — Ken Vanderpuye
*Assistant Examiner* — Amritbir Sandhu
(74) *Attorney, Agent, or Firm* — Clements Bernard PLLC; Christopher L. Bernard; Lawrence A. Baratta, Jr.

(57) ABSTRACT

A method and system of determining a new path through an optical network from a source node to a destination node when a link in an original path fails are disclosed. When a fault on a link is detected, adjoint weights are assigned to each operational link for each node on the original path. A connection cost is determined for each node based on the adjoint weights of the links connected to the node. A new path through the optical network is determined based at least in part on the adjoint weights and the connection costs.

20 Claims, 6 Drawing Sheets ical Communication Network Path Restoration

CROSS-REFERENCE TO RELATED APPLICATION

This application relates to and claims priority to Indian Patent Application Serial Number 42/DEL/2012, filed Jan. 5, 2012, the entirety of which is incorporated herein by reference.

STATEMENT REGARDING FEDERALLY SPONSORED RESEARCH OR DEVELOPMENT n/a

FIELD OF THE INVENTION

The present invention relates to optical networking, and more particularly to a method and system for establishing a restoration path in an optical network.

BACKGROUND OF THE INVENTION

Service provisioning in an optical network includes establishing a restoration connection when a fault in a link of an existing path occurs. Typically, in an optical network, when a fault in a link occurs, each connection along the original path is torn down and new connections are set up to reestablish the path. Setting up a connection in an optical network is more complicated than setting up a connection in a digital network. As an example, establishing a new connection in an optical network must allow for the additional time it takes to adjust an amplifier gain and to tune a laser to the proper wavelength at both the source and the destination node of the connection. For example, retuning a laser may take tens of seconds. The resultant delay can range from mere annoyance to the time-out of critical devices that were using the failed path.

Therefore, there is a need for establishing an alternate path when a link fails in an optical network in a manner that restores service as quickly as possible that does not require a change of laser wavelength or change in amplifier gain.

SUMMARY OF THE INVENTION

The present invention advantageously provides a method and system for path determination in an optical network. In one embodiment, a fault on a link between two nodes on an original path between a source node and a destination node is detected. Upon detection of the faulty link, an adjoint weight is assigned to each operational link in the original path. A connection cost associated with each node on the original path is determined based on the adjoint weights assigned to the links connected to the node. A new path between the source node and the destination node based on the adjoint weights and connection costs is determined. In some embodiments, a new path based on the adjoint weights and connection costs is determined by computing for each alternate path between the source node and the destination node, a sum of adjoint weights of each link on the alternate path and a sum of connection costs of each node on the alternate path.

According to another aspect, the invention provides a network node in an optical communication network. The network node includes a database having topology information relating to a topology of at least a portion of the network and having topology information relating to an original path through the network between a source node and a destination node. The network node also includes a processor to assign adjoint weights to each of a plurality of links. An adjoint weight of a link is assigned a first value if a link is in the original path and is assigned a second value if the link is not in the original path.

According to another aspect, the invention provides a method for determining a new path through an optical network from a source node to a destination node when a first link in an original path between the source node and the destination node fails. A first set of weights associated with operational links between the source node and the destination node is predetermined and is used when a latency in restoring the network is determined to be acceptable. A second set of weights associated with the operational links is determined upon failure of the first link when the latency in restoring the network is determined to be unacceptable. One of the first and second sets of weights is selected and summed for each of a plurality of alternate paths through the network from the source node to the destination node to determine an alternate path having the highest sum of weights.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
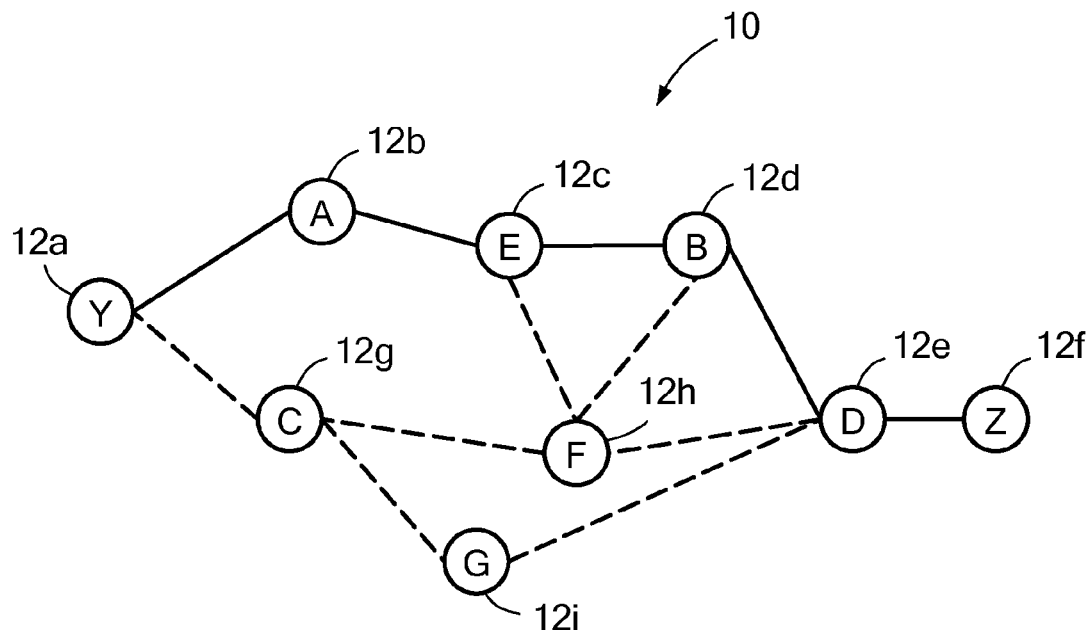
FIG. 1 is a block diagram of an exemplary network constructed in accordance with principles of the present invention in which the network has multiple paths between a source node and a destination node.

Before describing in detail exemplary embodiments that are in accordance with the present invention, it is noted that the embodiments reside primarily in combinations of apparatus components and processing steps related to establishing a new path through an optical network from source node to a destination node when a link failure occurs on an original path. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Referring now to the drawing figures, in which like reference designators denote like elements, there is shown in FIG. 1 a diagram of an exemplary network constructed in accordance with principles of the present invention, and denoted generally as "10." Network 10 includes a plurality of paths between a source node 12a and a destination node 12f. A solid line in the drawing figures is used to indicate an original path between the source node 12a and the destination node 12f via intermediate nodes 12b, 12c, 12d and 12e. Dashed lines represent alternate paths through the network which may include, for example, nodes 12g, 12h, and 12i (nodes 12a through 12i are referred to collectively herein as "nodes 12").

Figure 2:
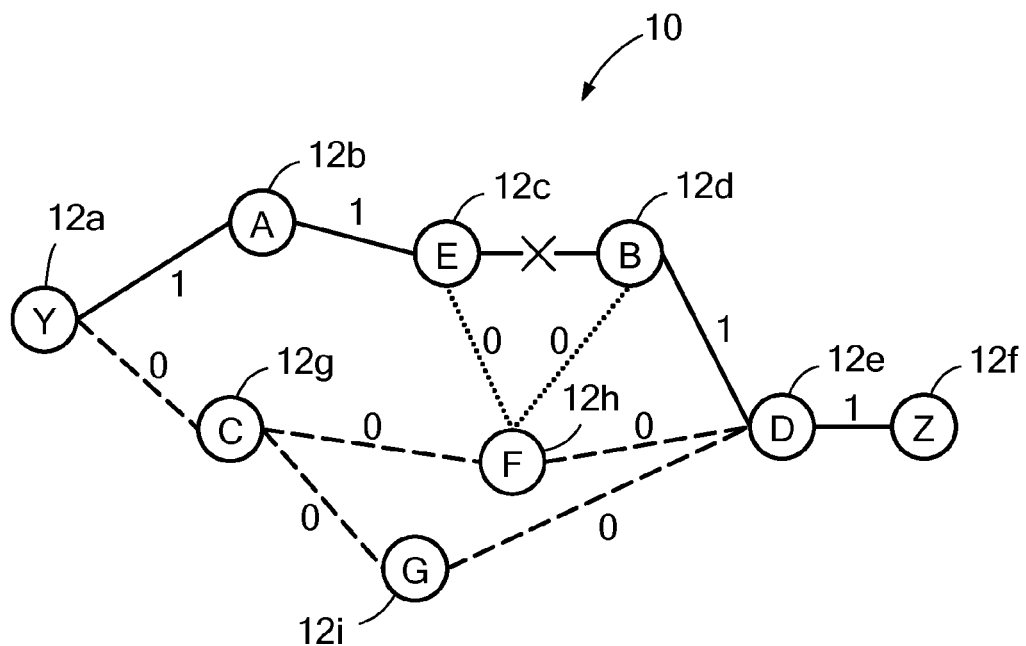
FIG. 2 is a block diagram of the network of FIG. 1 with a failed link between two nodes and showing adjoint weights for each link in the network.

FIG. 2 is a diagram of the network of FIG. 1 with a failed link between nodes E 12c and B 12d. FIG. 2 also shows adjoint weights associated with each link in the network. In this embodiment, the adjoint weights are either zero or one, although different values for the adjoint weights may be selected. In particular, the adjoint weights for each link on the original path shown in FIG. 1 is set to one, and the adjoint weight for all other links is set to zero. Thus, for example, an adjoint weight for the link between node Y 12a and node A 12b is one, whereas an adjoint weight for the link between node E 12c and F 12h is zero. In general an adjoint weight assigned to a link is a first value if the link is on the original path between the source node Y 12a and the destination node Z 12f, and the adjoint weight assigned to a link is a second value less than the first value if the link is not on the original path.

In addition to assigning an adjoint weight to an ingress link and an egress link of each node of the network, a connection cost is determined for each node. For example, in one embodiment, a first connection cost is assigned to the node when the adjoint weights of an ingress link and egress link of the node are both equal to the first value. A second connection cost greater than the first connection cost is assigned to the node when the adjoint weights of the ingress and egress links are both equal to the second value. A third connection cost greater than the second connection cost is assigned to the node when the adjoint weights of the ingress and egress links are not the same.

The adjoint weights and the connection costs are used to determine an alternate path between the source node Y 12a and the destination node Z 12f that bypasses the failed link between the node E 12c and the node B d, in the example of FIG. 2. To compute a desired alternate path, the adjoint weights along each possible alternate path are summed. For example, the sum of adjoint weights for the path from node Y 12a, to node A 12b, to node E 12c, to node F 12h, to node D 12e to node Z 12f is 4. The sum of adjoint weights for the path from node Y 12a to node A 12b, to node E 12c, to node F 12h, to node D 12e, node Z 12f is three. The desired alternate path is chosen by selecting the alternate path with the largest sum of adjoint weights. If two alternate paths have the same largest sum of adjoint weights the alternate path having the smallest connection costs, as determined by summing the connection costs of each node in the path, is selected as the desired new alternate path.

The connection costs may be based on the adjoint weights according to the following Table 1.

TABLE 1

| INGRESS/EGRESS | ADJOINT WEIGHT = 0 | ADJOINT WEIGHT = 1 |
|---|---|---|
| ADJOINT WEIGHT = 0 | Create new connection Cost = 1 | Delete connection-create new connection Cost = 2 |
| ADJOINT WEIGHT = 1 | Delete connection-create new connection Cost = 2 | Reuse connection Cost = 0 |

Note that the values of 0, 1, and 2 are used herein as exemplary values. Other values may be used to reflect the relative costs.

Referring to FIG. 2, for node A 12b, the connection cost is 0 since the adjoint weights of both the ingress and egress links are equal to one. This means that the connections at node A 16 remain, and are not torn down. For node E 12c, the connection cost is equal to 2 since the adjoint weight of the ingress link is equal to 1 and the adjoint weight of the egress link is equal to 0. This means that a connection is torn down (namely, the connection to node B 12d) and a new connection, (namely, the connection to node F 12h) is created.

For node F 12h, the connection cost is one since the adjoint weight for the ingress link is 0 and the adjoint weight for the egress link is 0. This means that a connection must be created but no connection is torn down at the node F 12h. For node B 12d, the connection cost is 2 since the adjoint weight for the ingress link is 0 and the adjoint weight for the egress link is 1. This means that the connection to the node E 12c is torn down and the connection to the node D 12e is created. For node D 12e, the connection cost is 0 since the adjoint weights for both the ingress link and the egress link are equal to 1.

Thus, when a connection cost is 0, the connection need not be torn down, but rather, can be reused. A connection cost equal to 1 means a new connection involving the node is created without tearing down an existing connection. A connection cost equal to 2 means that a connection must be torn down and replaced with a new connection. For example, at node B 12d with connection cost equal to 2, the original connection to node E 12c is torn down and a new connection to node F 12h is created.

When a connection cost of a node is equal to 0, indicating no change in the connections at the node, a designated transit list (DTL) is marked to indicate no change. As will be explained further below, when a fault occurs, the source node sends a set-up message that includes the DTL.

The connection costs of Table 1 are used when imposing a strict shortest path first (SPF) requirement. For a loose SPF requirement, the connection costs of Table 2 may be used.

TABLE 2

| INGRESS/EGRESS | ADJOINT WEIGHT = 0 | ADJOINT WEIGHT = ADMIN WEIGHT |
|---|---|---|
| ADJOINT WEIGHT = 0 | Reuse connection Cost = 0 | Delete connection-create new connection Cost = 2 |
| ADJOINT WEIGHT = ADMIN WEIGHT | Delete connection-create new connection Cost = 2 | Create new connection Cost = 1 |

Note that the cost values of 0, 1, and 2 are used herein as exemplary values, it being understood that other values may be used to reflect the relative costs. Here, the links on the original path are assigned an adjoint weight of 0 and the links not on the original path are assigned an admin weight. Admin weights for each span may be pre-assigned by an operator based on desired operational characteristics or may be assigned/changed automatically based on link latency. Of course, other methods for assigning admin weights may be used.

Figure 3:
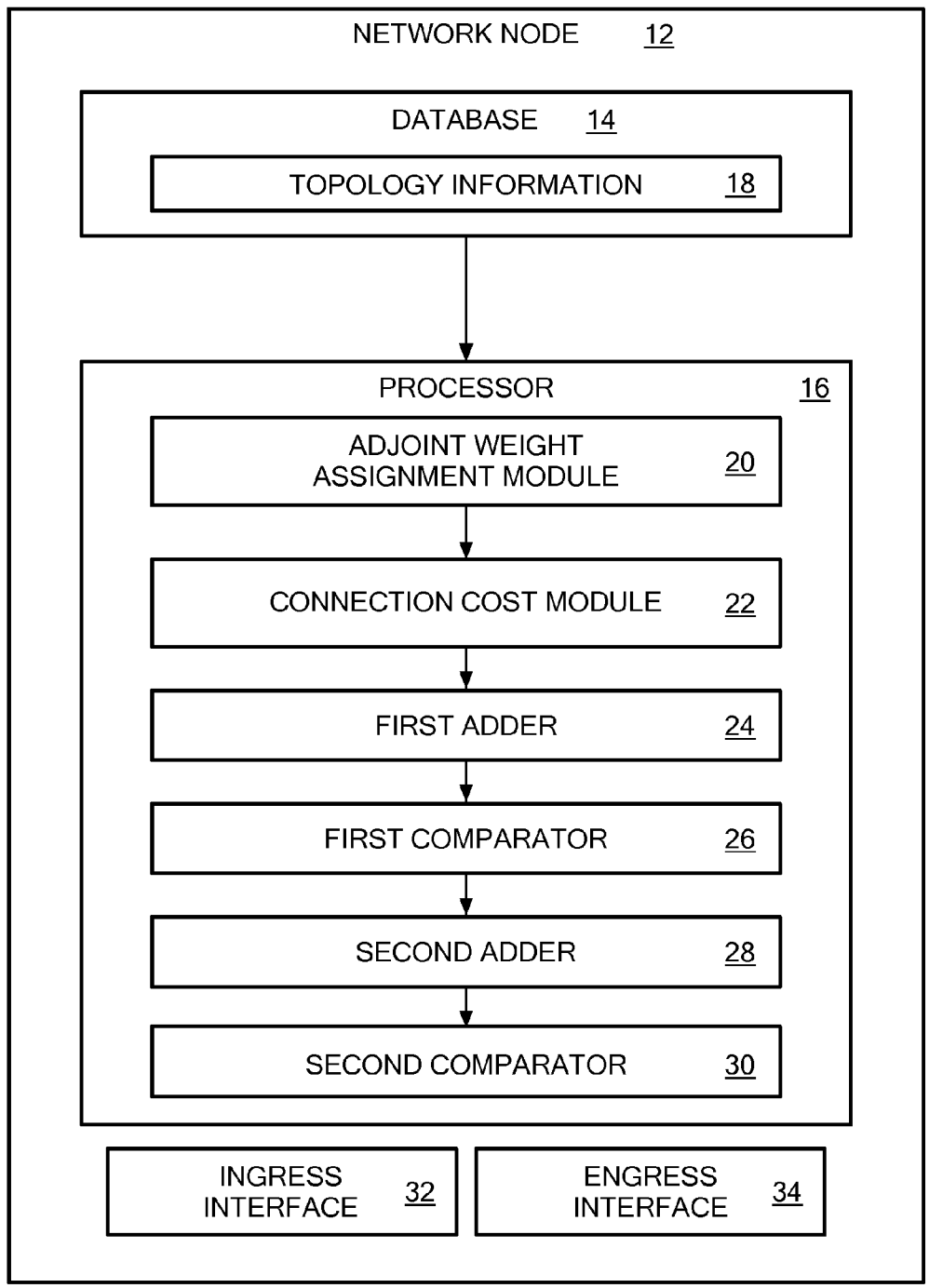
FIG. 3 is an exemplary network node constructed in accordance with principles of the present invention.

FIG. 3 shows an exemplary network node 12 constructed in accordance with principles of the present invention. The network node 12 has a database 14 and a processor 16. The database 14 contains topology information 18. The topology information 18 includes topology information relating to a topology of at least a portion of the network, and more particularly includes topology information relating to an original path through the network from a source node to a destination node. The topology information 18 also includes the adjoint weights of each link, and a connection cost associated with each node in the network.

The processor 16 operates under the direction of software instructions to perform the various functions described herein for determining and establishing a new path in an optical network when a link in an original path in the network fails. For example, the processor 16 may implement an adjoint weight assignment module 20 to determine adjoint weights for each of a plurality of links. In one embodiment, in the event of a link fault, the adjoint weight assignment module 20 assigns an adjoint weight of one to each operational link on the original path, and assigns an adjoint weight of zero to all other links.

The processor 16 may also implement a connection cost module 22 that computes a connection cost for each node based on the adjoint weights assigned to an ingress link and an egress link of the node. The processor 16 may also implement a first adder 24 that sums the adjoint weights along each alternate path between the source node and the destination node, when a link on an original path between these nodes has failed. A first comparator 26 compares the summations of adjoint weights for each alternate path to determine a path with the highest sum. A second adder 28 sums the connection costs for each alternate path and a second comparator 30 compares the connection cost summations to determine an alternate path having a least sum of connection costs.

The network node 12 also includes an ingress interface 32 and an egress interface 34 to interface with an ingress link and an egress link, respectively. The ingress interface 32 is connected to an ingress link and the egress interface 34 is connected to an egress link. The processor 16 exercises control over these interfaces to tear down and establish connections to ingress and egress links as needed.

Figure 4:
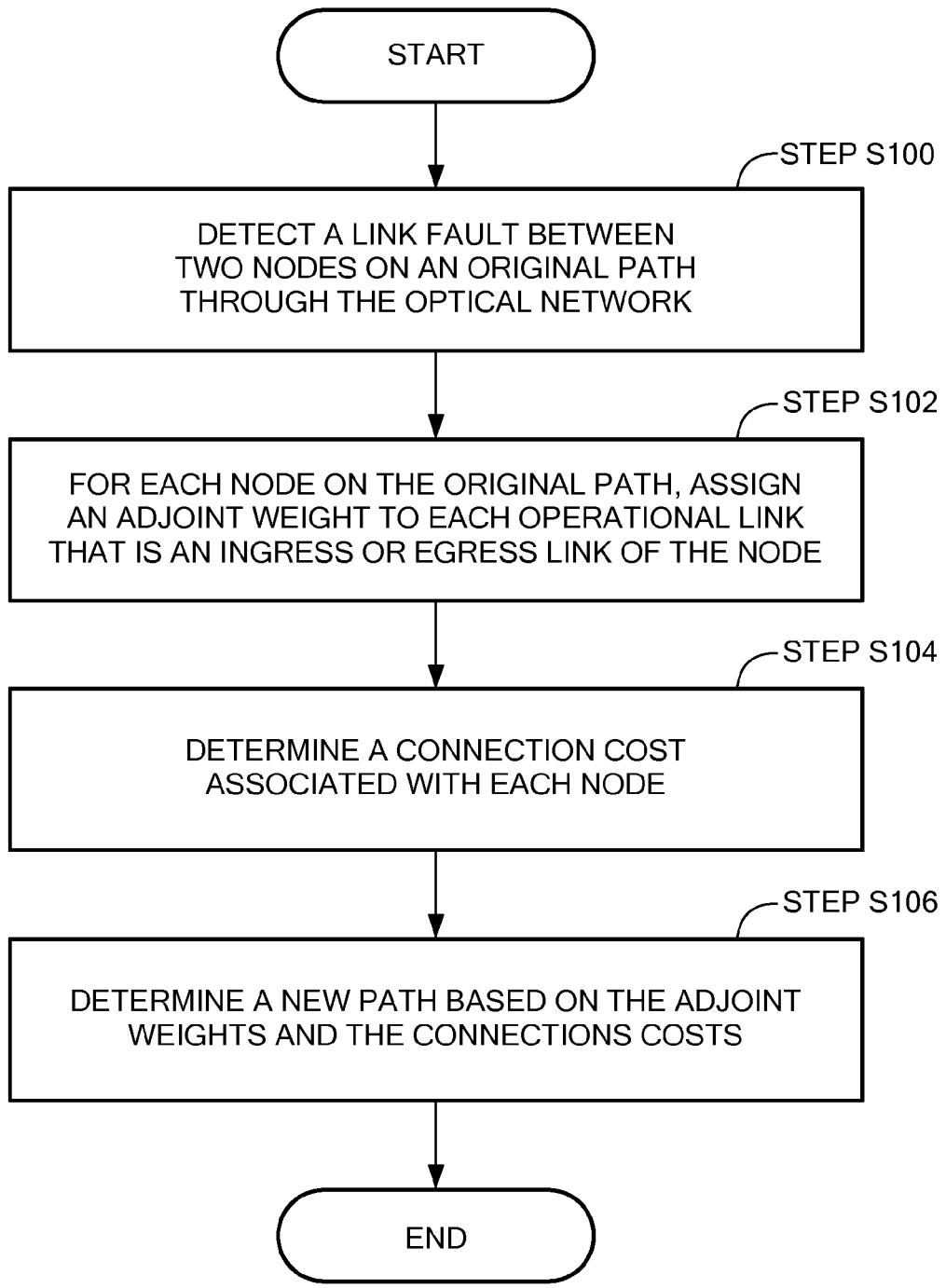
FIG. 4 is a flowchart of an exemplary process for determining a new path between a source node and a destination node upon detection of a link fault, in accordance with principles of the present invention.

FIG. 4 is a flow chart of an exemplary process for determining a new path between a source node, such as the source node 12a, and a destination node, such as the destination node 12f, upon detection of a link fault, in accordance with principles of the present invention. A fault in a link is detected between two nodes on an original path through a network (step S100). For each node on the original path, an adjoint weight is assigned to each operational link connected to the node (step S102). Also, a connection cost is computed for each node (step S104). A new path is determined based on the adjoint weights and the connection costs (step S106).

Figure 5:
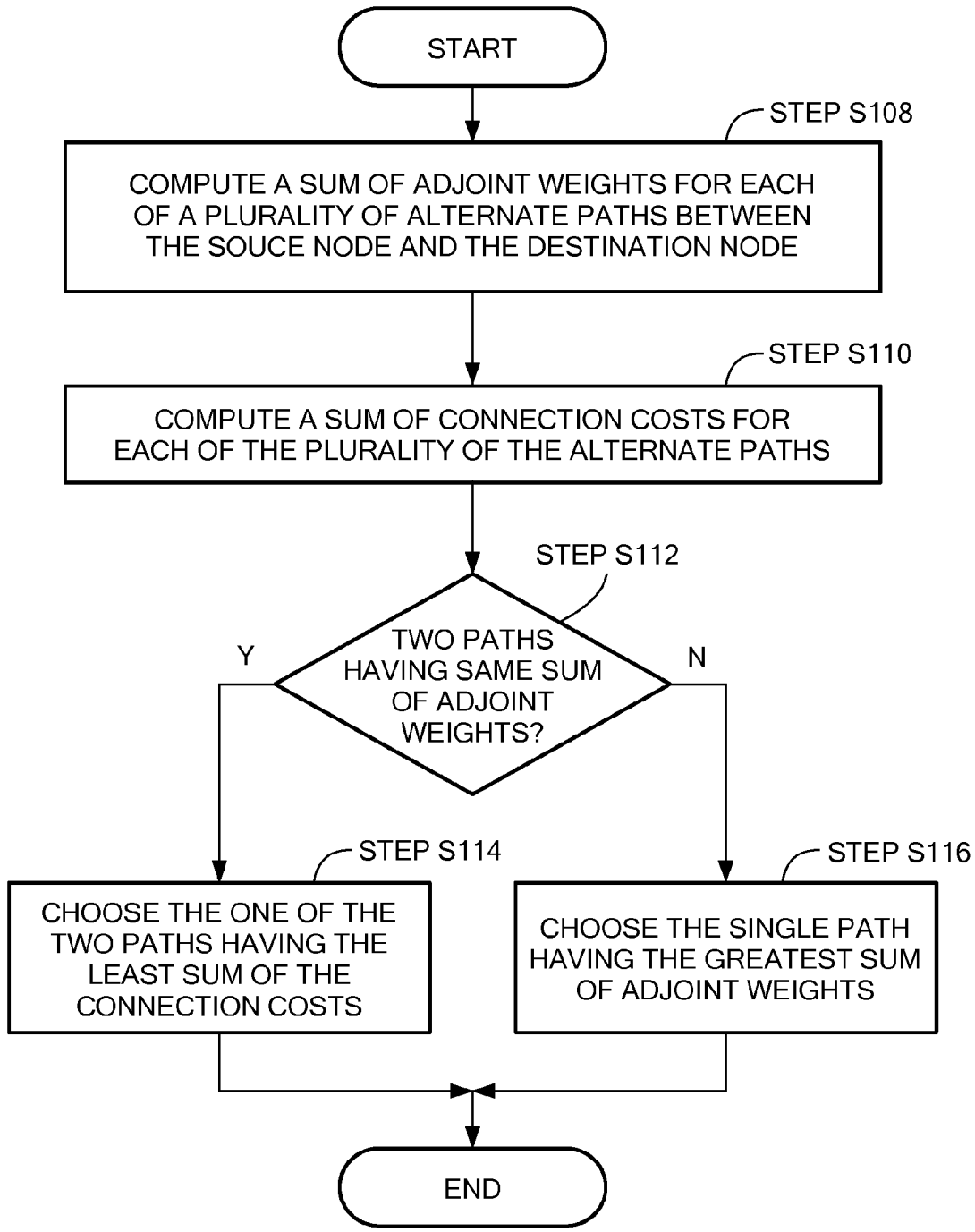
FIG. 5 is a flowchart of an exemplary process for selecting a path based on adjoint weights and connection costs, in accordance with principles of the present invention.

FIG. 5 is a flow chart of an exemplary process for selecting a path based on adjoint weights and connection costs, in accordance with principles of the present invention. A sum of adjoint weights assigned to each link for each of a plurality of alternative paths between a source node, e.g. 12a, and a destination node, e.g., 12f, is computed (step S108). A sum of connection costs for each node for each of the plurality of alternative paths is also computed (step S110). A path having the greatest sum of adjoint weights is determined. If two or more paths are tied for first place (step S112), then the one of the two or more paths having the least connection costs is chosen (step S114). Otherwise, the path having the greatest sum of adjoint weights is chosen as the path to replace the original path (step S116).

Figure 6:
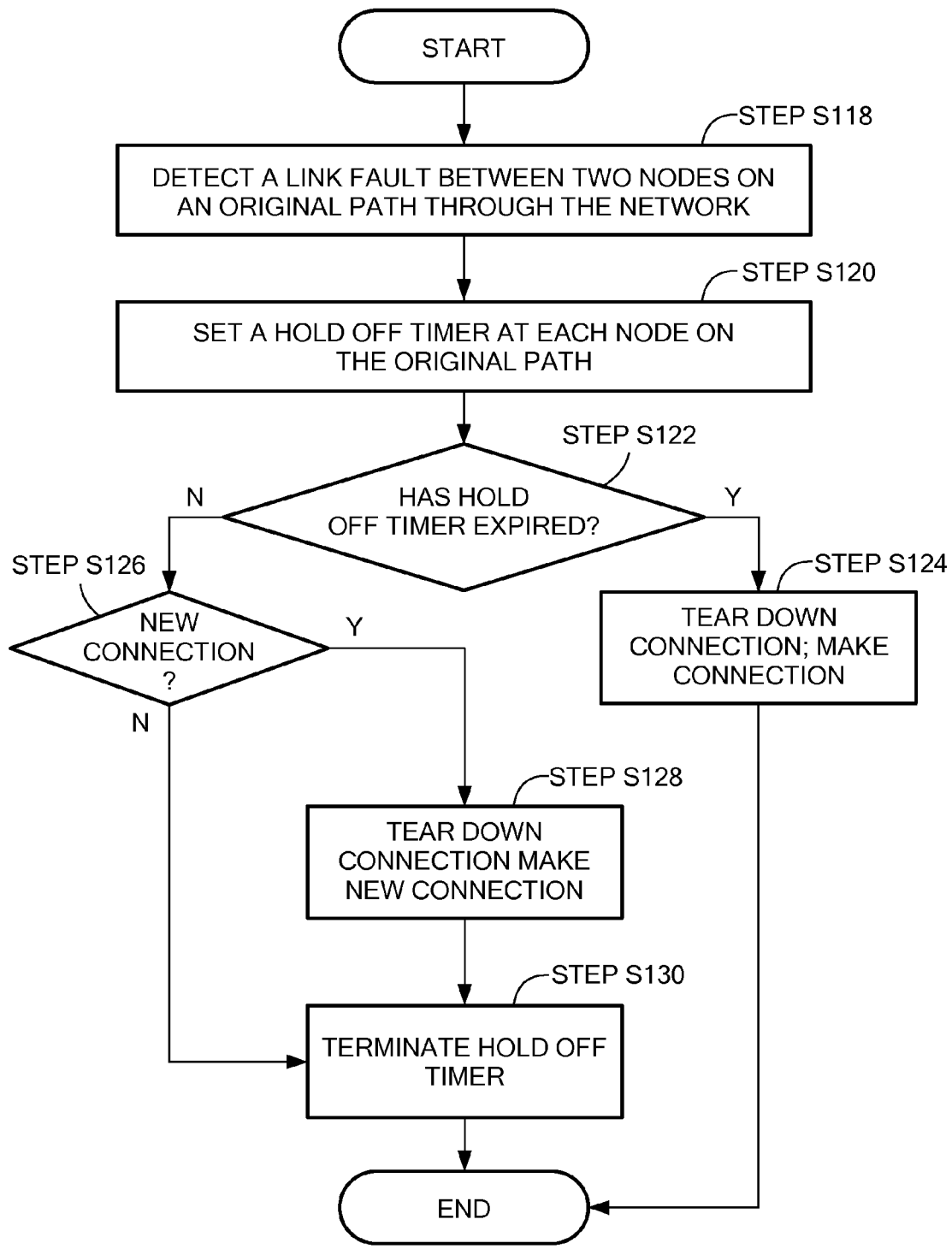
FIG. 6 is a flowchart of an exemplary process for timing to establish whether to tear down and rebuild a connection based on a timer, in accordance with principles of the present invention.

FIG. 6 is a flow chart of an exemplary process for timing to establish whether to tear down and rebuild a connection based on a timer, in accordance with principles of the present invention. A fault is determined on a link between two nodes on an original path through the network between a source node, e.g., 12a, and a destination node, e.g., 12f, (step S118). A hold-off timer at each node of the original path is started and may run for a predetermined period of time, e.g., a duration of about 250 milliseconds to one second. (step S120). A purpose of the hold-off timer is to allow time for a process of summing adjoint weights and construction costs to determine a new path, before a node releases its connections to its current ingress and egress links. In another embodiment, a long timer, e.g., 5 to 10 minutes can be used in conjunction with a special release message. The special release message can be sourced by the originating node, e.g., 12a, to clear up unused connections after the alternate path has been set up. Under this arrangement, the existing connection is retained in order to give the alternate path as much time as possible to re-use the existing active optical channels.

Thus, a node 12 will determine if its hold-off timer has expired, (step S122). If the hold-off timer has expired, then the connections at the node that will become part of the alternate path computed after the failure are torn down (step S124). Connection re-establishment is done as part of the mesh restoration activity. In this case, if the hold-off timer expires, the most likely scenario is that the connection will not be re-established on this node unless path computation and re-establishment of alternate path is exceptionally slow. Upon expiration of the hold-off timer, the existing connection may be torn down as part of the signaling logic. Re-establishment is addressed using source-based mesh restoration.

In one embodiment, path computation is based on the Dijkstra shortest path first (SPF) algorithm in which cost/weigh comparisons are made as part of each iteration of the Dijkstra process. The adjoint weights may be assigned before each Dijkstra iteration. The connection cost may be determined during each Dijkstra iteration based on the connection cost table. It is noted that the present invention is not limited to use of the Dijkstra process.

If the hold-off timer has not expired, then the node determines if it is to establish a new connection, (step S126). If a new connection is to be established at the node, then the existing connection is torn down and the new connection is setup, (step S128). This may be done by receiving a setup message as part of the alternate path setup, e.g., mesh restoration. Then, the hold-off timer is terminated, (step S130). Also, from step S126, if a new connection is not required, then the hold-off timer is terminated, (step S130). Whether a connection is to be torn down or created is based on the connection cost assigned to the node as discussed above with reference to tables 1 and 2.

In one embodiment, a flag in the incoming setup message as part of the DTL/transit list indicates whether the connection on the corresponding node 12 is being re-used or not. Hence it becomes a matter of looking at the flag and making a decision as to whether the exiting connection needs to be torn down, a new connection needs to be made, both or neither. The hold off timer is a mechanism which avoids the tear down of exiting active channels which are otherwise costly operations in terms of time when those channels have to be re-set up.

Figure 7:
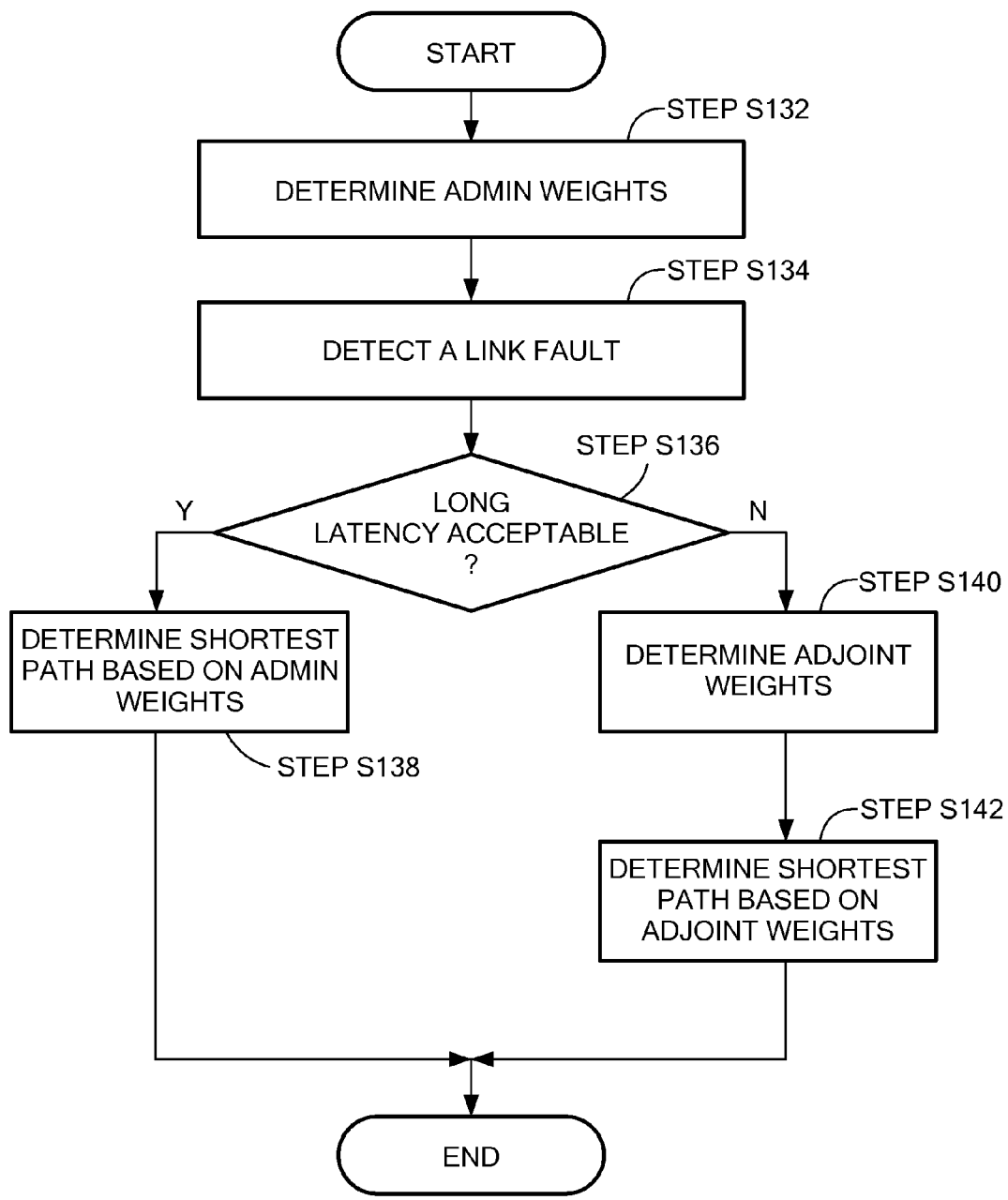
FIG. 7 is a flowchart of an exemplary process for selecting between administrative weights and adjoint weights, in accordance with principles of the present invention.

FIG. 7 is a flow chart of an exemplary process for selecting between administrative weights and adjoint weights, in accordance with principles of the present invention. A set of administrative (admin) weights are predetermined, (step S132). Afterwards, if a link fault occurs, it is detected, (step S134). Before determining a shortest alternate path, the system determines if a long latency for setting up the new connection is acceptable, (step S136). If so, a shortest path is determined based on the admin weights, (step S138). If a long latency is not acceptable, as determined at step S136, then adjoint weights are determined for alternate paths, (step S140). A shortest path is then determined based on the adjoint weights (step S142).

Thus, in one embodiment, when a fault in a link is detected, the source node Y 12 is notified. The source node Y 12 issues a set up request that is propagated to each node in the network that is in the original path. The source node Y 12 also performs a link adjoint path computation to assign adjoint weights to each link in one or more alternate paths. Further, the source node Y 12 will also calculate connection costs at each node in each alternate path. The setup message to be sent from the source node Y 12 includes a logical one in the designated transit list (DTL) for each node that has a connection cost of zero. A logical one in the DTL indicates that no connection is torn down or created at the node.

Instead of clearing all connections and reestablishing new connections, a hold-off timer is set at each of the nodes in the original path. A request for a new path is propagated to each node of the original path. If the DTL for the node is set, then the hold-off timer for the node is cancelled (terminated) and the request is forwarded by the node. If the DTL for the node is not set, then the hold-off timer for the node is cancelled, a connection at the node is cancelled, a new connection may be created, and the request is forwarded by the node. If a hold-off timer expires at a node, then the connection is cleared. If the node reboots, the hold-off timer is reset.

Therefore, when a fault occurs, instead of deleting connections at every node in the original path, only connections at the nodes adjacent to the faulty link are torn down. This enables reuse of the wavelength of the original connection.

The present invention can be realized in hardware, or a combination of hardware and software. Any kind of computing system, or other apparatus adapted for carrying out the methods described herein, is suited to perform the functions described herein. A typical combination of hardware and software could be a specialized computer system, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method of path determination in an optical network, the method comprising:
    detecting a fault on a link between two nodes of the optical network, the two nodes being on an original path between a source node and a destination node of the optical network, the original path having a set of operational links and the faulty link;
    for each node on the original path, assigning, after the fault is detected, one of a first value and a second value as an adjoint weight to each operational link connected to the node;
    determining a connection cost associated with each node on the original path, a connection cost associated with a node being based on the adjoint weights of the links connected to the node; and
    determining the new path between the source node and the destination node based at least in part on the adjoint weights and the connection costs.

2. The method of claim 1, wherein an adjoint weight assigned to a one of the operational links is the first value if the one of the operational links is a link on the original path, the adjoint weight assigned to the one of the operational links is the second value if the one of the operational links is not a link on the original path, and the second value is less than the first value.

3. The method of claim 2, wherein, if adjoint weights for an ingress link and an egress link of a node on the original path are both equal to the first value, then the connection cost associated with the node on the original path is set to a first cost.

4. The method of claim 3, wherein, if adjoint weights for the ingress link and the egress link of the node on the original path are both equal to the second value, then the connection cost associated with the node on the original path is set to a second cost greater than the first cost.

5. The method of claim 4, wherein, if adjoint weights for the ingress link and the egress link of the node on the original path are different, then the connection cost associated with the node is set to a third cost greater than the second cost.

6. The method of claim 2, wherein determining the new path based on the adjoint weights and the connection costs, includes:
    computing for each alternate path between the source node and the destination node:
        a sum of adjoint weights associated with each link on the alternate path;
        a sum of connection costs associated with each node on the alternate path; and
        when no two alternate paths have the same sum of adjoint weights, choosing as the new path, the alternate path having the greatest sum of adjoint weights; and
        when two alternate paths have the same greatest sum of adjoint weights, choosing as the new path, the one of the two alternate paths that has the smallest sum of connection costs.

7. The method of claim 1, further comprising, upon detecting the fault on the link between two nodes: setting a hold-off timer at each node on the original path; and when a new path is determined before the expiration of the hold-off timer at a node, then choosing an ingress link of the node and an egress link of the node as links to be used for the new path.

8. A network node in an optical communication network, the network node comprising:

a database containing topology information relating to a topology of at least a portion of the network, and containing topology information relating to an original path through the network between a source node and a destination node; and a processor, the processor assigning adjoint weights, after a fault is detected on the original path in response to the fault, to each of a plurality of links in the at least a portion of the network, an adjoint weight being a first value if a link is in the original path, and being a second value if the link is not in the original path.

9. The network node of claim 8, wherein the processor further determines a connection cost associated with each node in the at least a portion of the network, the connection cost associated with a node being based on adjoint weights assigned to links connected to the node.

10. The network node of claim 9, wherein, a connection cost associated with a node is:

a first cost if an adjoint weight of an ingress link of the node and an adjoint weight of an egress link of the node are both equal to the first value;

a second cost greater than the first cost if the adjoint weight of the ingress link and the adjoint weight of the egress link are both equal to the second value; and a third cost greater than the second cost if the adjoint weight of the ingress link and the adjoint weight of the egress link are not equal.

11. The network node of claim 10, wherein the processor further: determines, for each path that is an alternative to the original path, a sum of adjoint weights associated with each link on the alternate path; and determines an alternate path with a highest sum of adjoint weights.

12. The network node of claim 11, wherein the processor further: determines, for each alternative path, a sum of connection costs associated with each node on the alternate path; and determines an alternate path with the lowest sum of connection costs.

13. The network node of claim 11, wherein, when two or more alternate paths have an equal sum of adjoint weights, then choosing a one of the two or more alternate paths having a least connection cost.

14. A method for determining a new path through an optical network from a source node to a destination node when a link in an original path from the source node to the destination node fails, the method comprising:

selecting between using a first set of weights and a second set of weights, each weight associated with a link in a path between the source node and the destination node, the first set of weights being predetermined and being used when a latency in restoring the network is determined to be acceptable, and the second set of weights being determined after the fault is detected when the latency in restoring the network is determined to be unacceptable and summing the weights of the selected first or second set for each of a plurality of alternate paths through the network from the source node to the destination node; and determining an alternate path, the alternate path having a highest sum of weights.

15. The method of claim 14, further comprising determining a connection cost for each node in each of the plurality of alternate paths, a connection cost for a node being based on a weight of an ingress link of the node and a weight of an egress link of the node.

16. The method of claim 15, further comprising, when two or more alternate paths have an equal sum of weights, choosing a one of the two or more alternate paths having a least connection cost.

17. The method of claim 14, further comprising:

starting a hold-off timer in each node of the original path;

when the hold-off timer has not expired and a new connection is to be created at a node:

tearing down an existing connection; creating the new connection; and terminating the hold-off timer of the node;

when the hold-off timer has not expired and a new connection is not to be created at a node, terminating the hold-off timer of the node; and when the hold-off timer expires without creating a new connection at the node, tearing down a connection at the node and recreating the connection at the node.

18. The method of claim 15, further comprising starting a hold-off timer at each node, and marking nodes having a minimum connection cost.

19. The method of claim 18, wherein, when a node is marked, terminating a hold-off timer of the node without creating a new connection at the node.

20. The method of claim 18, wherein, when a node is not marked, terminating the hold-off timer of the node, tearing down a connection at the node and creating a new connection bypassing a failed connection.

* * * * *